Nov. 27, 1962  P. ROBINSON  3,066,247
ELECTRICAL CAPACITORS
Filed Aug. 25, 1954
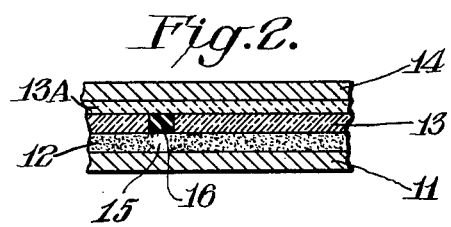
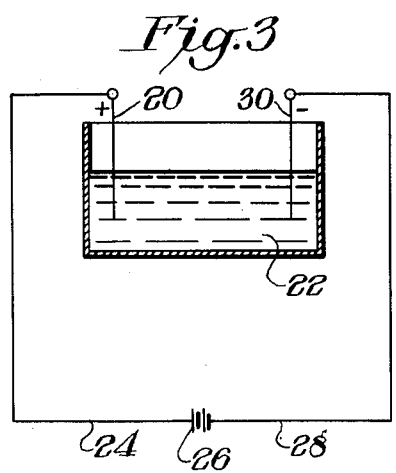
INVENTOR
*Preston Robinson*
BY *Connolly and Hutz*
ATTORNEYS United States Patent Office 3,066,247
Patented Nov. 27, 1962

3,066,247
ELECTRICAL CAPACITORS
Preston Robinson, Williamstown, Mass., assignor to Sprague Electric Company, North Adams, Mass., a corporation of Massachusetts
Filed Aug. 25, 1954, Ser. No. 452,014
8 Claims. (Cl. 317—230)

The present invention relates to electrical capacitors and more particularly to the so-called self-healing type of electrical capacitors.

A capacitor is said to be self-healing if it possesses the ability to restore itself to operating condition after its electrodes have been locally short circuited. In the ordinary capacitor having a layer of aluminum oxide formed on an aluminum foil and another layer of counterelectrode metal over the oxide layer, self-healing results when the counterelectrode metal volatilizes at the site of the short circuit thereby leaving an insulated space about the short-circuiting path. The short circuit is thereby removed and the capacitor continues to function at a capacity only slightly lower than before. The thickness of the counterelectrode is extremely critical. If this electrode is too thin the heat generated by the short circuiting current will not be conducted away rapidly enough and the capacitor may be damaged beyond repair before the desired volatilization takes place. On the other hand, if the uncoated electrode is too thick the heat generated by the short circuiting current will be conducted away so rapidly that the metal will not volatilize at the short circuit and the entire capacitor will have to be discarded. In commercial practice, the critical thickness of counterelectrode metal is difficult to provide. Even though the critical thickness of the counterelectrode is obtained, the device described above suffers from excessive power factor and/or high series resistance aspects not appreciated in the teachings of the prior art.

It is an object of this invention to overcome the foregoing and related disadvantages. It is another object of this invention to produce a self-healing electrical capacitor that may be more readily manufactured. It is a further object of the present invention to provide a new and improved electrical capacitor having an electrically-conductive self-healing film of lead peroxide contiguous with a dielectric stratum.

These objects are attained in accordance with the present invention wherein there is produced a self-healing electrical capacitor comprising a dielectric stratum integral with a surface of one electrode and a film of lead peroxide ($PbO_2$) contiguous with said stratum, said film of less than 0.01″ thickness.

Lead peroxide is a fairly good conductor of electricity, but when heated is converted to non-conducting lead monoxide. Thus, when a flaw occurs and short-circuited current flows between the capacitor electrodes, the lead peroxide at the point of short-circuit is heated by the current and converted to an insulating plug of lead monoxide. Thus extremely desirable and improved electrical capacitors having self-healing properties can be obtained without undue critical dependence upon electrode layer thickness provided excessive contact resistance between the solid electrolyte and that element of the device contiguous with it is avoided. Little contact resistance results from deposition of the lead peroxide film onto the dielectric stratum. However that surface of the solid electrolyte film which is not contiguous with the dielectric stratum is the region of high contact resistance when prior art procedures are followed. The recognition of this critical feature resulted once, excessive thicknesses of the self-healing film were avoided. Satisfactory devices, where excessive power factors can be tolerated, can be produced without adherence to the teachings of low contact resistance, however where it is preferred to obtain a much improved electrical capacitor having self-healing properties, both limitations of low contact resistance and a thickness of peroxide not to exceed 0.010″ must be observed.

The invention will be further described with reference to the appended drawings in which:

FIG. 1 is a fragmentary section view of an electrical capacitor representing one embodiment of this invention;

FIG. 2 is an enlarged fragmentary section view of the embodiment of the invention shown in FIG. 1 illustrating the self-healing action of the lead peroxide layer;

FIG. 3 is a schematic diagram disclosing one process by which the lead peroxide layer of this invention may be provided; and FIG. 4 is a fragmentary sectional view of an electrical capacitor representing a further embodiment of this invention.

Like reference characters refer to like parts, and the views are somewhat distorted to more clearly illustrate the invention.

Referring more specifically to the embodiment of this invention shown in FIG. 1, film forming anode material 11 such as, for example, aluminum or tantalum, is provided with an oxide stratum 12 which in turn is coated with a lead peroxide film 13, and a second or counterelectrode 14 of such material as zinc is then placed on lead peroxide layer 13. As discussed above, the capacitor must not have excessive contact resistance at the surface 13A of the lead peroxide layer 13.

FIG. 2 illustrates the condition of the condenser section after a short circuit has occurred and the self-healing action has taken place. For ease of illustration it is assumed that a short has occurred at spot 15, the heat thereby generated having converted that portion of the lead peroxide film to non-conducting lead monoxide as represented by insulating plug 16.

The lead peroxide film thickness must not be greater than 0.010″ but preferably within the range of from about 0.002″ to about 0.010″. Excessive thicknesses introduce appreciable undesirable electrical resistance into the capacitor circuit, while too thin a film does not always form sufficient lead monoxide to effectively stop short-circuits of large magnitude. The improved thickness tolerance of the invention appears to be based, at least in part, on the fact that lead peroxide is not a very good conductor of heat so that the heating action of short-circuiting currents is effectively localized. As recited in the foregoing one must achieve low values of contact resistance from the surface of the solid electrolyte film to the adjacent element in order to obtain capacitors with satisfactory power factors. Such contact resistances for purposes of this application are considered low when they are of a value less than the total resistance of 500 ohms. Such contact resistance, when approaching the maximum amount, will result in power factors at 1000 cycles of about 5% or less. In both FIGS. 1 and 2 reference has been made to element 13A which identifies that region of low contact resistance which aspect is hitherto unrecognized in the teachings of the prior art. With FIGS. 1 and 2 the low contact resistance between the lead peroxide layer 13 and the counterelectrode 14 is obtained through that type of counter electrode which is indicated, namely, a vapor deposited metal layer such as zinc. Such an electrode is disposed upon the surface of a solid electrolyte in an intimate fashion, although caution must be taken so as to avoid excessive temperatures of the deposited metal prior to condensation on the surface of the solid electrolyte. Vapor deposited zinc in a vacuum system does not involve such temperatures as would cause conversion of the lead peroxide layer to the lead monoxide at the region adjacent to condensation. If in the processing of such capacitors as in FIG. 1 it is desired to use other condensed metals as aluminum and copper, and where processing conditions are such that even the zinc deposited electrode results in excessive power factors, a conducting strata such as micronized graphite should be placed on the solid electrolyte 13 prior to deposition. Such graphite is preferably of a micro size, for example, in the region of 0.5 micron in diameter, and is painted or dipped on the counterelectrode by procedures well-known in the art. A volatile solvent should be used as the vehicle for depositing the graphite upon the conducting film. Numerous other materials could also be utilized as alternatives to the carbon and these include colloidal copper particles also introduced by means of painting or dipping, silver particles, etc. Of these conducting particles the graphite is preferred for one obtains in operation when the self-healing function takes place decomposition of the segment of the graphite layer adjacent to the region of self-healing, thus assisting the self-healing property of the lead peroxide film. There is another procedure for decreasing the contact resistance of the solid electrolyte to that element contiguous with it when a structure such as embodied in FIG. 4 is utilized. Briefly, FIG. 4 consists of two film forming anode foils 11 and 14 which are provided with an oxide stratum 12, the latter functioning as the dielectric. Each of the oxide stratums is coated with a lead peroxide film 13 and has sandwiched between these lead peroxide films a structure 32 which provides for low contact resistance. This structure 32 is of a fibrous spacer such as paper impregnated with lead peroxide. This low contact resistance segment 32 is sandwiched in between the two symmetrical sections by rolling through a calender, or other appropriate pressure device, followed by drying.

In accordance with this invention an elongated strip of aluminum is coated with an aluminum oxide film and a subsequent lead film. The oxide and lead films may be formed and provided with a terminal lead in accordance with U.S. Patent 2,408,910, issued October 8, 1946, to John Burnham, and the lead film may be subsequently converted to lead peroxide in a manner shown in connection with FIG. 3 of the drawings. The operation is similar to the charging of a lead type storage cell. The lead filmed foil 20 is immersed in an $H_2SO_4$ electrolyte solution 22, and is connected to the positive lead 24 of a direct current source shown as battery 26 while an inert or substantially pure lead plate 30 is connected to the negative lead 28 of the battery. During the electrolytic action the external surface of the lead film on the foil 20 is gradually converted to lead peroxide. The thickness of the lead peroxide will vary with the initial thickness of lead, the electrolyzing time, and the electrolyzing current which if sufficiently prolonged will completely convert the lead film to $PbO_2$. A lead peroxide film of about 0.003" thick was obtained with the above apparatus by immersing a foil coated with a layer of lead 0.003" thick in a 20% by weight solution of $H_2SO_4$ in water after 60 minutes of electrolyzing at a current density of 10 milliamperes per square centimeter of anode surface. After the electrolyzing the coated foil is washed with water, dried, and its $PbO_2$ surface is coated with zinc or lead as described in the above-mentioned Burnham patent. The assembly is then wound into the desired shape, as described in the above patent and housed in a container in the usual manner.

The presence of unreacted lead between the lead peroxide and the aluminum or tantalum oxide does not appreciably affect the operation of the resulting capacitor so that about 30% of the original lead film thickness may remain unconverted if desired. The converting current may be as low as 10 milliamperes per square centimeter of anode surface, or as large as is obtainable. Aside from the excessive gassing, heavy anode currents of 300 or more amperes per square centimeter produce lead oxide films substantially equivalent to that produced by smaller current densities. The lead films are converted to lead peroxide films of substantially the same thickness when considered in film rather than bulk conversions.

Instead of a 20% solution in water by weight, the $H_2SO_4$ concentration can be varied from about 1 to about 60% with no appreciable difference in the $PbO_2$ produced. Other electrolytes that can be used are sulfates such as aluminum sulfate, magnesium sulfate and sodium sulfates, and the effective concentration ranges are from 1% by weight to saturated solutions. The electrolyzing temperature is not critical and can range from the freezing to the boiling point of the electrolyte.

The device having the construction of that pictured in FIG. 4 is produced in accordance with this invention by coating an elongated strip of aluminum with aluminum oxide film and a subsequent lead film as set forth in the manner set forth in the preceding example. The foil having a non-porous oxide coating of about 0.5 micron thickness is coated with a lead film of an average thickness of about 0.0001". Conversion of the lead film to a lead peroxide film of approximately 0.0003" was obtained by electrolysis of the lead in a 20% by weight solution of sulphuric acid in water. This electrolysis was for a period of 60 minutes at a current density of approximately 10 milliamperes per square centimeter of anode surface. 0.00025" thick kraft paper spacer was impregnated with a pasty aqueous mass lead peroxide. The two filmed foils having the lead peroxide layers are placed on opposite sides of the lead peroxide impregnated spacer and calendered under slight pressure, for example 10 pounds per square inch, into intimate contact. This technique of construction resolves favorably the contact resistance aspect and when used with constructions having a total thickness of lead peroxide of less than 0.010" produces highly effective self-healing capacitors of excellent power factors.

Other methods may be used to form the novel foil of the present invention. For instance, a lead peroxide film may be formed on an oxide formed foil by inserting the formed foil in a solution of lead tetraacetate in a non-oxidizable solvent such as acetic acid, withdrawing the foil from the solution to leave a film of the solution on the foil and subsequently hydrolyzing this film by dipping the foil in water. Other lead compounds having the general formula

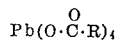

where R is a hydrocarbon radical as for example ethyl, myristyl, amyl, phenyl, etc., may be used along with or in place of the lead tetraacetate. As an example, an aluminum foil may be coated with an oxide film in accordance with U.S. Patent 2,408,910 and then coated with a lead peroxide layer by inserting it in a 10% solution of lead tetraacetate by weight in acetic anhydride, withdrawing the foil from the solution, and completely hydrolyzing the tetraacetate in the solution dragged out on the foil surface by blowing moist air or steam upon it. Moist air is preferred to steam as a hydrolyzing agent. The temperature of the hydrolysis can range from 0° to 100° C. A lead peroxide film. 0.002" thick, is ordinarily obtained by this method.

For either of the above processes the original aluminum foil should be very pure (about 99.99% aluminum) for best results.

The present invention can also be practiced by first forming the desired $PbO_2$ layer on one of the electrodes, and then juxtaposing the coated electrode against a condenser dielectric with the $PbO_2$ layer contacting the dielectric. Both electrodes may be applied in this manner if desired, although in general, one will provide all the self-healing that is needed.

The electrode carrying the $PbO_2$ film may be aluminum, tantalum, zirconium, or other suitable valve metal, and may be formed as described above. With the electrolytic forming technique, an initial lead layer is provided for conversion to the PbO$_2$. Where the electrode is lead, the PbO$_2$ film is readily provided by only partially converting the thickness of a lead foil. The tetraacetate hydrolysis described above can also be used to coat PbO$_2$ on an electrode, and it is preferred to have tetraacetate applied only to one surface of the electrode, inasmuch as a coating on the face not juxtaposed against the dielectric will serve no useful purpose. When applied to the dielectric, the PbO$_2$ can advantageously also be confined to one surface.

If desired, two or more successive hydrolyzed PbO$_2$ layers may be formed. The electrolytic preparation however, can be effected by the oxidation of a single layer of lead.

The present invention is particularly applicable to the manufacture of new and highly desirable rolled and stacked capacitors having all types of dielectrics including the so-called "electrostatic" type described above and the electrolytic type which operate with an electrolyte in contact with a film of a metal oxide such as aluminum or tantalum oxide formed in situ on a foil of the corresponding metal. For instance, it has been found that the self-healing characteristics of capacitors having ceramic dielectrics are also improved by incorporating a film of lead peroxide between the ceramic dielectric and one or both of the condenser electrode.

This application is a continuation-in-part of my presently filed patent application Serial No. 239,645, filed August 1, 1951, which has become abandoned.

As many apparently widely different embodiments of this invention may be made without departing from the spirit and scope hereof, it is to be understood that the invention is not limited to the specific embodiments hereof except as defined in the appended claims.

What is claimed is:

1. A capacitor comprising a body of film-forming metal, a dielectric film constituting a compound of said film forming metal on the surface of said body, a layer of a solid semi-conductive material in intimate contact with said dielectric film, said semiconductive material being reducible in the presence of high fields, said film-forming metal being oxidizable upon the reduction of said semiconductor material to heal imperfections in said dielectric film and an electrically conducting layer overlying said layer of semiconductive material.

2. A self-healing capacitor comprising a body of film-forming metal, a dielectric oxide film formed on the surface thereof, a layer of semiconductive higher oxide of a metal in intimate contact with said dielectric film, said higher oxide being reducible by current flow therethrough to a non-conducting lower oxide, said film-forming metal being oxidizable upon reduction of said higher oxide to heal imperfections in said dielectric film and an electrically conducting layer overlying said layer of semiconductive higher oxide.

3. A capacitor as claimed in claim 2, wherein the film-forming metal is tantalum.

4. A capacitor as claimed in claim 2, wherein the film-forming metal is aluminum.

5. A capacitor as claimed in claim 2, wherein the semiconductive higher oxide is lead peroxide.

6. A capacitor as claimed in claim 2, wherein the layer of semiconductive higher oxide of a metal is formed in situ from a compound of that metal.

7. A capacitor as claimed in claim 2, wherein a layer of graphite is interposed between the semiconductive higher oxide layer and the overlying electrically conducting layer.

8. A self-heating capacitor comprising a body of tantalum, a dielectric tantalum oxide film formed on the surface thereof, a layer of semiconductive dioxide of a metal formed in situ in intimate contact with said dielectric film from a compound of that metal, said dioxide being reducible by current flow therethrough to a non-conducting lower oxide, said tantalum being oxidizable upon reduction of said dioxide to heal imperfections in said tantalum oxide film, and an electrically conducting layer overlying said layer of semiconductive dioxide.

References Cited in the file of this patent

UNITED STATES PATENTS

| | | |
|---|---|---|
| 1,238,660 | Field-Frank | Aug. 28, 1917 |
| 1,621,058 | Burger | Mar. 15, 1927 |
| 1,966,163 | Clark | July 10, 1934 |
| 2,383,311 | Hein | Aug. 21, 1945 |
| 2,408,910 | Burnham | Oct. 8, 1946 |
| 2,448,513 | Brennan | Sept. 7, 1948 |